Figures 1, 5:
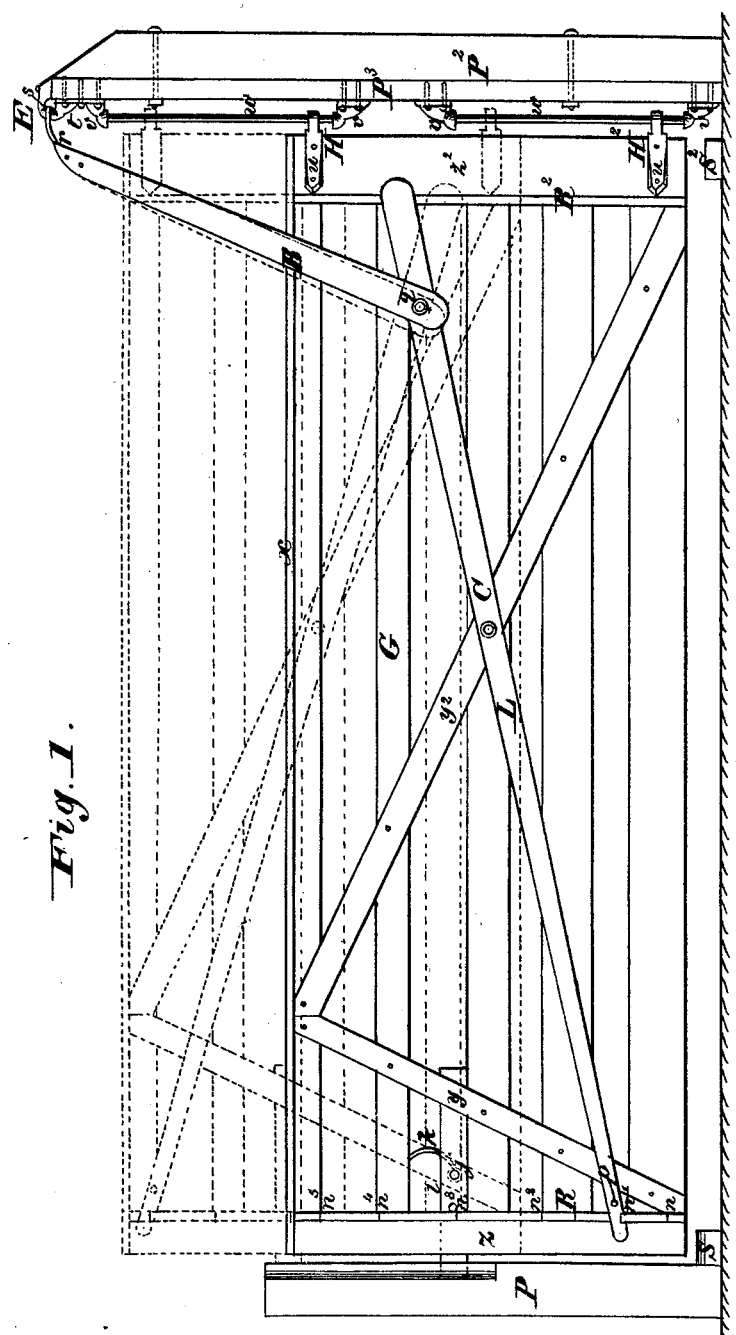

2 Sheets—Sheet 1.

T. F. TIMBY.
GATE.

No. 185,801.  Patented Dec. 26, 1876.

WITNESSES
Chas. Gooch
Wm H Pearce

INVENTOR
Theodore F. Timby
By Knight & Co Attorneys

2 Sheets—Sheet 2.
T. F. TIMBY.
GATE.
No. 185,801. Patented Dec. 26, 1876.
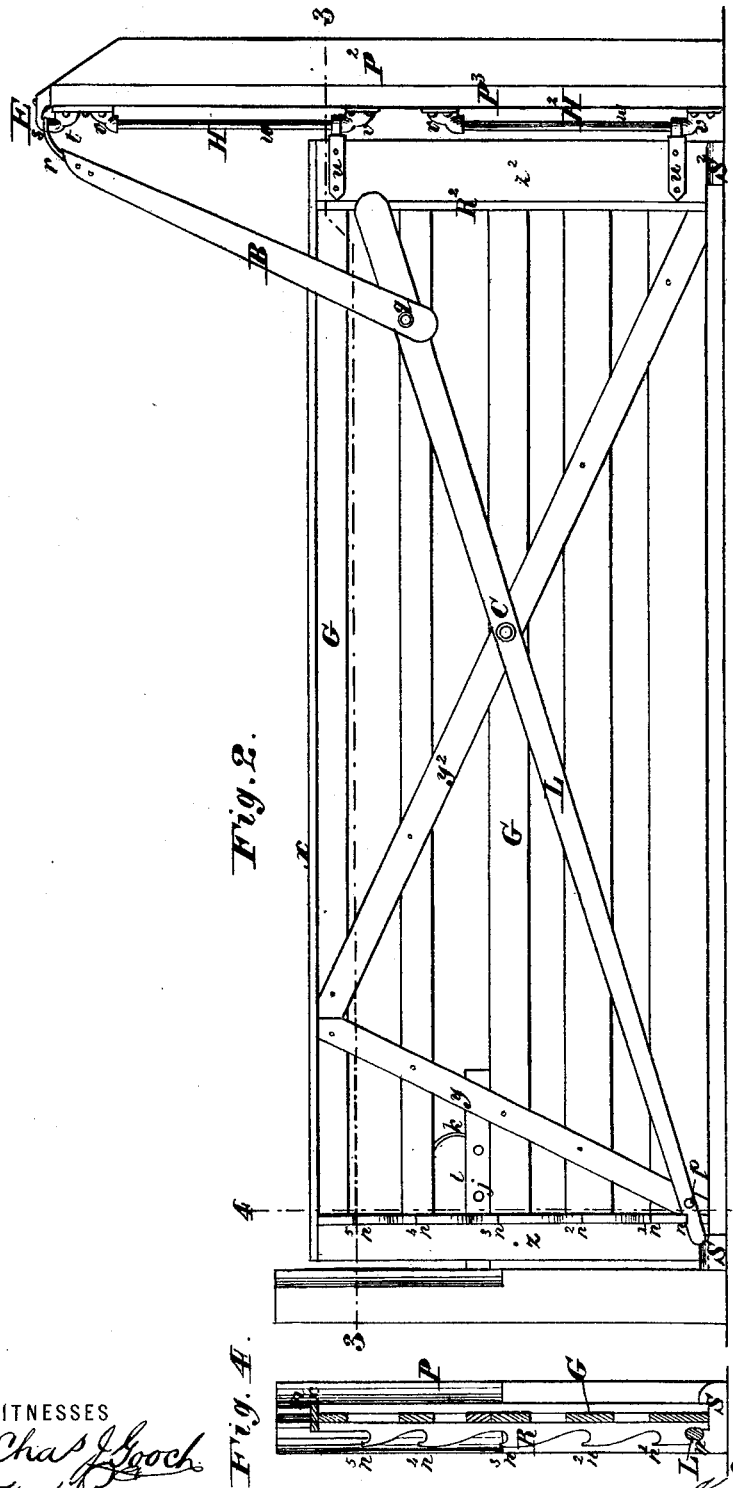
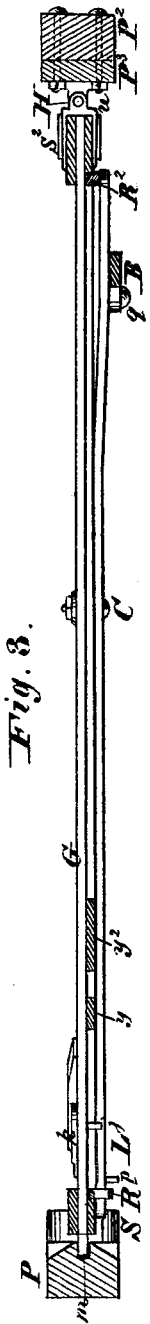
WITNESSES
Chas J Gooch
Wm H Pearce
INVENTOR
Theodore F Timby
By Knight Bros Attorneys

UNITED STATES PATENT OFFICE.

THEODORE F. TIMBY, OF ALMA, MICHIGAN.

IMPROVEMENT IN GATES.

Specification forming part of Letters Patent No. 185,801, dated December 26, 1876; application filed October 19, 1876.

*To all whom it may concern:*

Be it known that I, THEODORE F. TIMBY, of Alma, in the county of Gratiot, in the State of Michigan, have invented a new and useful Improvement in Gates, of which the following is a specification:

This invention relates to swinging gates generally, and as an improvement it has reference to those gates in which provision has been made for correcting or taking up sag, and for elevating the gates above snow or mud, or so as to separate small stock from large.

The invention consists, first, in a swinging gate supported at or near its center from an elevated pivot on the hinge-post, and thus balanced; secondly, in the combination of an elevated suspending-pivot, a connecting bar or link, a lever working parallel to the face of the gate, a pivotal bolt or stud at or near the center of the gate, and a rack at the free end of the gate, with the gate and its sliding hinges for raising and lowering the gate, and by same means balancing the gate in the manner aforesaid; thirdly, in a strip or flange at the hinge end of the gate, in connection with said lever, pivot, and rack, to spring the free end of the lever into the notches of the rack, and to keep the lever from rubbing the paint; fourthly, in sills having a notch or notches to receive the lower edge of the gate, and a reversed notch at the lower end of the rack, in combination with the adjustable gate and its elevating-lever, to secure the lowered gate against vertical and lateral movement, and to relieve the swinging supports of its weight; fifthly, in a false hinge-post, which accompanies the gate, and supports the hanging attachment in proper position, in combination with the gate and its other attachments, said false post being adapted to be bolted to an old hinge-post or one of like simple form.

The improved gate in its several swinging positions is always horizontal, and is adapted to swing open on either or both sides of the fence, and is perfectly simple and easy to operate, as hereinafter more fully set forth.

Figure 1 is a front view or side elevation of a farm-gate illustrating this invention, the gate being shown in its lowest and highest swinging positions by full and dotted lines. Fig. 2 is another front view, showing the gate lowered and locked down. Fig. 3 represents a horizontal section on the line 3 3, Fig. 2. Fig. 4 represents a vertical section on the line 4 4, Fig. 2. Fig. 5 is a face view of the upper end of the false hinge-post, showing the parts attached thereto.

Like letters of reference indicate corresponding parts in the several figures.

G represents the gate proper; P $P^2$, the driven or planted posts; $P^3$, a false post bolted to the face of the hinge-post P, and S $S^2$ a pair of sills arranged beneath the respective ends of the closed gate. The gate G is composed of parallel longitudinal boards united at their respective ends by battens $z$ $z^2$ on each side, and braced diagonally by a pair of oblique braces, $y$ $y^2$, in lieu of the ordinary single diagonal brace, and finished at top by a horizontal cap-board, $x$. The hinge-post $P^2$ may be the old hinge-post when this gate is substituted for another. The gate is hung by means of special hinges H $H^2$, having long vertical pintle-rods $w$, supported at both ends by cast brackets $v$, and embraced by sliding eyes $u$, the latter attached to the battened hinge end of the gate. The post members of the hinges, and an elevated pivot, E, above the upper hinge, are attached by screws to the false post $P^3$, so that the parts can be permanently united in the manufactory. The elevated pivot E is composed of a pivot-bracket, $t$, and a cap, $s$, of which the former has been cast in one part with the upper one of the hinge-brackets $v$. The vertical wrist of the bracket $t$ is embraced by the rearwardly-projecting eye of a metallic strap, $r$, attached to the upper end of a bar or link, B, the lower end of which is attached by a loose bolt or rivet, $q$, to the inner end of a long lever, L. This lever is fulcrumed on a bolt or stud, O, at or near the center of the gate, and the outer end of the lever engages with a vertical rack, R, at the free end of the gate, said lever working parallel to the face of the gate, and close thereto. A hand-pin, $p$, facilitates moving the lever L, and its free end is rounded to fit retaining-notches of corresponding shape, as shown in Fig. 4.

When the gate G is not suspended from the elevated pivot E the gate rests on the sills S S², and the sill S has a notch, o, in its upper surface to embrace the lower edge of the gate so as to afford lateral as well as vertical support. The free end of the lever L in this position of the gate (illustrated in Figs. 3 and 4,) occupies an inverted notch, n, at the lower end of the rack R, and the gate is thus locked down so as to prevent animals or small children from opening it. The rack R is a vertical strip or flange, supported at the inner edge of the batten z at the front of the gate. A corresponding strip or flange, R², supported by the front batten z² at the hinge end of the gate forms a rubbing-bar, to prevent any defacement of the painted batten and to spring the free end of the lever L into mesh with the rack. The gate is elevated by lifting the free end of the lever L, and is supported at different heights by the respective main notches $n^1$ $n^2$ $n^3$ $n^4$ $n^5$ of the rack R, each of which represents an elevation of six inches in the full-sized gate. The gate is shown in full lines in Fig. 1 in the position in which it ordinarily swings, the lowest main notch $n^1$ being used. The gate is shown in dotted lines in the same figure in its highest position.

In either of its swinging positions the gate turns on the hinges H H² and elevated pivot E, and is supported vertically by the latter. The point on the gate at which it is supported is consequently the bolt or stud C, at or near the center of the gate, said bolt or stud being the fulcrum or pivot of the lever L. The weight of the gate is thus balanced, or nearly balanced, on said central pivot, and consequently no tendency to sag, or substantially none, exists.

The latch-post P is made with its face double-beveled, as shown in Fig. 3, and with a vertical groove, m, at the apex of the inclines, to accommodate a sliding latch, l. The latter is arranged between the battens z and between the brace y and a corresponding back strip, on top of a central longitudinal board of the gate, and is projected by a spring, k, and furnished with a hand-pin, j, by which to retract it to open the gate in either direction. In closing the gate the latch is forced back by the inclines and projected by its spring so as to fasten automatically, and in raising or lowering the gate the latch slides in the groove m.

The improved gate may be made self-closing by the usual modification of the hinges, and is intended and adapted not simply for farm use but for any and all places where a swinging gate is or may be employed, the materials and shape of the gate proper and other parts to be modified as particular circumstances may demand.

I am aware that hand-levers working parallel to the face of the gate have before been proposed as means for taking up sag, and also in combination with sliding hinges, an elevated pivot, a connecting-rod, and a rack, as means for raising and lowering the gate, said levers being pivoted at the hinged end of the gate. I hereby disclaim those devices. The location of the pivot at or near the center of the gate is an essential feature of my elevating-lever, and by means thereof any provision whatever for taking up sag is rendered superfluous.

The following is what I claim as new, and desire to secure by Letters Patent, namely—

1. The pivotal bolt or stud C, at or near the center of the gate, in combination with the elevated suspending-pivot E, in line with the hinges, or nearly so, and connecting media B L, substantially as herein described, for balancing the weight of the gate on its vertical support, in the manner set forth.

2. The combination of the suspending-pivot E, the connecting bar or link B, the lever L, the pivotal bolt or stud C, at or near the center of the gate, and the rack R at the free end of the gate, with said gate and and its sliding hinges, substantially as shown and described, for raising and lowering said gate in the manner specified.

3. The combination of the rubbing strip or flange R² at the hinge end of the gate, the lever L, the central bolt or stud C, and the vertical rack R at the free end of the gate, as specified, for the purpose set forth.

4. The sills S S², one or both being notched, as shown, and the rack R having a reversed notch, n, at its lower end, in combination with the adjustable gate and its elevating-lever, substantially as shown and described, for the purposes specified.

5. The false-post P³, having the gate G attached thereto by sliding hinges, and provided with an elevated suspending-pivot, in combination with said gate and its adjusting-lever and rack, and the connecting bar or link B, as herein set forth, for the purposes described.

THEODORE F. TIMBY.

Witnesses:
T. R. TIMBY,
JAS. L. EWIN.